United States Patent [19]
Mollmann et al.

[11] Patent Number: 5,396,791
[45] Date of Patent: Mar. 14, 1995

[54] ENGINE TESTING MOUNTING ADAPTOR

[75] Inventors: Daniel E. Mollmann; Pamela M. Boehm, both of Cincinnati; Eugene F. Gaffney, Mason; Michael P. Swift, Milford; Mark E. Stegemiller, Franklin; Kenneth O. Johnson, Cincinnati; Stephen L. Carmichael, Hamilton, all of Ohio

[73] Assignee: General Electric Company, Cincinnati, Ohio

[21] Appl. No.: 106,475

[22] Filed: Aug. 13, 1993

[51] Int. Cl.⁶ .................................................. G01L 1/10
[52] U.S. Cl. ............................ 73/116; 248/554; 269/46; 269/909
[58] Field of Search .............. 73/116, 117.1, 583, 73/865.6; 248/554, 557, 629, 638, 672, 676; 269/46, 316, 317, 909

[56] References Cited

U.S. PATENT DOCUMENTS

| | | | |
|---|---|---|---|
| 3,834,221 | 9/1974 | Swis et al. | 73/116 |
| 4,174,627 | 11/1979 | Swis et al. | 73/116 |
| 4,511,112 | 4/1985 | Ruehle | 285/544 |
| 4,660,796 | 4/1987 | Garrec | 285/544 |
| 4,848,717 | 7/1989 | Bevill | 248/670 |
| 4,875,374 | 10/1989 | Pinson | 76/663 |
| 4,932,628 | 6/1990 | Pacheco | 248/676 |
| 5,085,396 | 2/1992 | Mansson | 248/678 |

FOREIGN PATENT DOCUMENTS 2096776 10/1982 United Kingdom ............ 73/117.4

Primary Examiner—Richard E. Chilcot, Jr.
Assistant Examiner—Eric S. McCall
Attorney, Agent, or Firm—Jerome C. Squillaro; Bernard E. Shay

[57] ABSTRACT

A flexible adaptor mounts an aircraft gas turbine engine to a test stand. The adaptor includes an upper frame configured for mounting on the test stand, and a lower frame spaced from the upper frame and configured for supporting the engine. A spring flexibly joins the lower frame to the upper frame to simulate the flexibility of an aircraft wing which supports the engine during operation.

11 Claims, 5 Drawing Sheets

ENGINE TESTING MOUNTING ADAPTOR

The present invention relates generally to aircraft engine testing, and, more specifically, to a stationary test stand for supporting an aircraft gas turbine engine during power testing.

BACKGROUND OF THE INVENTION

Aircraft gas turbine engines include various rotors having blades rotating therewith such as fan, compressor, and turbine blades which generate vibratory excitation forces during operation. Accordingly, the engine is conventionally designed to maximize the margin between the various operational excitation frequencies and the critical frequencies associated with the natural resonance modes of vibration to minimize undesirable vibration and for obtaining a suitable useful life of the engine during operation.

The vibratory response of the engine is typically affected by its supporting structure in the aircraft. For example, an aircraft engine is typically supported to an aircraft wing by a conventional pylon. The aircraft wing has inherent flexibility in the vertical direction for example, which therefore provides a flexible support of the engine mounted thereto. In the past, the installed vibratory response of the engine was affected little by the flexible wing mounting, and therefore engine design and development assuming a relatively rigid support provided acceptable results.

For example, during the development of an aircraft gas turbine engine the various stator and rotor components thereof must be suitably designed for obtaining suitably low vibration during operation. In order to be certified for an aircraft application, the engine is suitably tested for vibratory response to ensure acceptable vibratory levels. Upon completion of the certification program and during production of the engines, each engine is typically tested before shipment in a conventional stationary test stand as well as being typically flight tested in an aircraft to ensure acceptably small levels of vibration. If vibration is excessive, the engine requires rebalancing to meet the appropriate specifications which involves additional procedures and time and is therefore relatively expensive to accomplish.

A typical test stand includes a vertical support column suitably mounted to a foundation in the ground, with a head frame at the top thereof from which individual aircraft engines are removably mounted for undergoing testing. During ground testing, the engine is operated at various levels of output power thrust and various components thereof are monitored for vibration levels. The test stand itself is typically a rigid structure having a spring constant of an order of magnitude greater than that of the stiffness of the pylon supporting the engine to the test stand. Conventional test stands typically include a removable adaptor which mounts the engine and pylon to the test stand head frame for allowing ready assembly and disassembly of the engine to the test stand. A conventional adaptor is also a rigid component typically having a flexibility or spring rate an order of magnitude greater than that of the pylon and engine support.

Improvements in aircraft and engine design require lower levels of acceptable engine vibration and, therefore, improved test stands are desired for better testing the installed system dynamics of the engine as it would operate in an actual aircraft engine environment.

SUMMARY OF THE INVENTION

A flexible adaptor mounts an aircraft gas turbine engine to a test stand. The adaptor includes an upper frame configured for mounting on the test stand, and a lower frame spaced from the upper frame and configured for supporting the engine. A spring flexibly joins the lower frame to the upper frame to simulate the flexibility of an aircraft wing which supports the engine during operation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
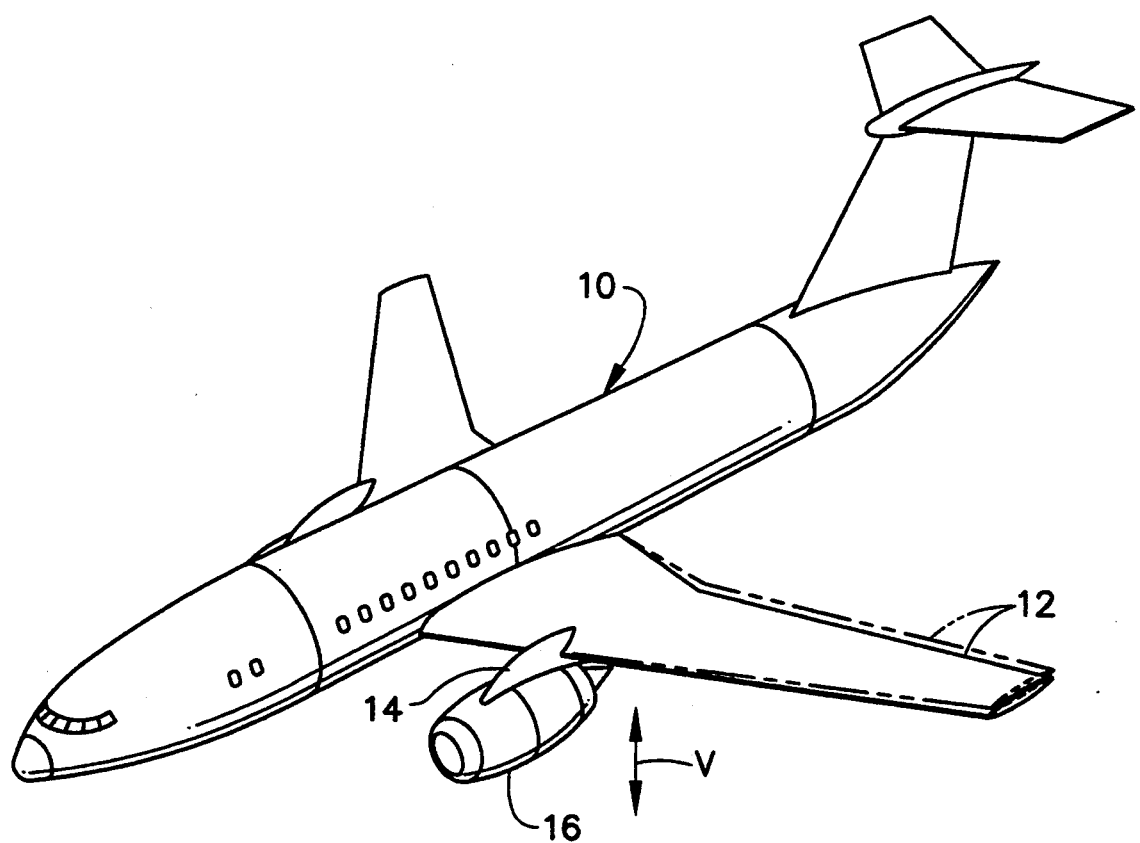
FIG. 1 is a perspective view of a portion of an exemplary aircraft having a wing-mounted gas turbine engine.

Illustrated in FIG. 1 is an exemplary aircraft 10 having a wing 12 which includes a conventional pylon 14 supporting a conventional turbofan aircraft gas turbine engine 16. The wing 12 has inherent vertical flexibility as shown by the vertical movement thereof relative to the aircraft fuselage as represented by the vertical double-headed arrow labeled V and the solid and phantom line positions of the wing 12.

The engine 16 includes various rotors having fan, compressor, and turbine blades rotating therewith (not shown) which provide vibratory excitation forces during operation. The engine 16 is therefore conventionally designed to maximize the frequency margins between the excitation forces and the natural resonance modes of vibration of the engine for obtaining suitably low vibration levels thereof during operation. Since the engine 16 is supported by the conventional pylon 14 to the flexible wing 12, the installed system dynamics of the engine 16 can be affected by the flexibility of the wing 12.

Figure 2:
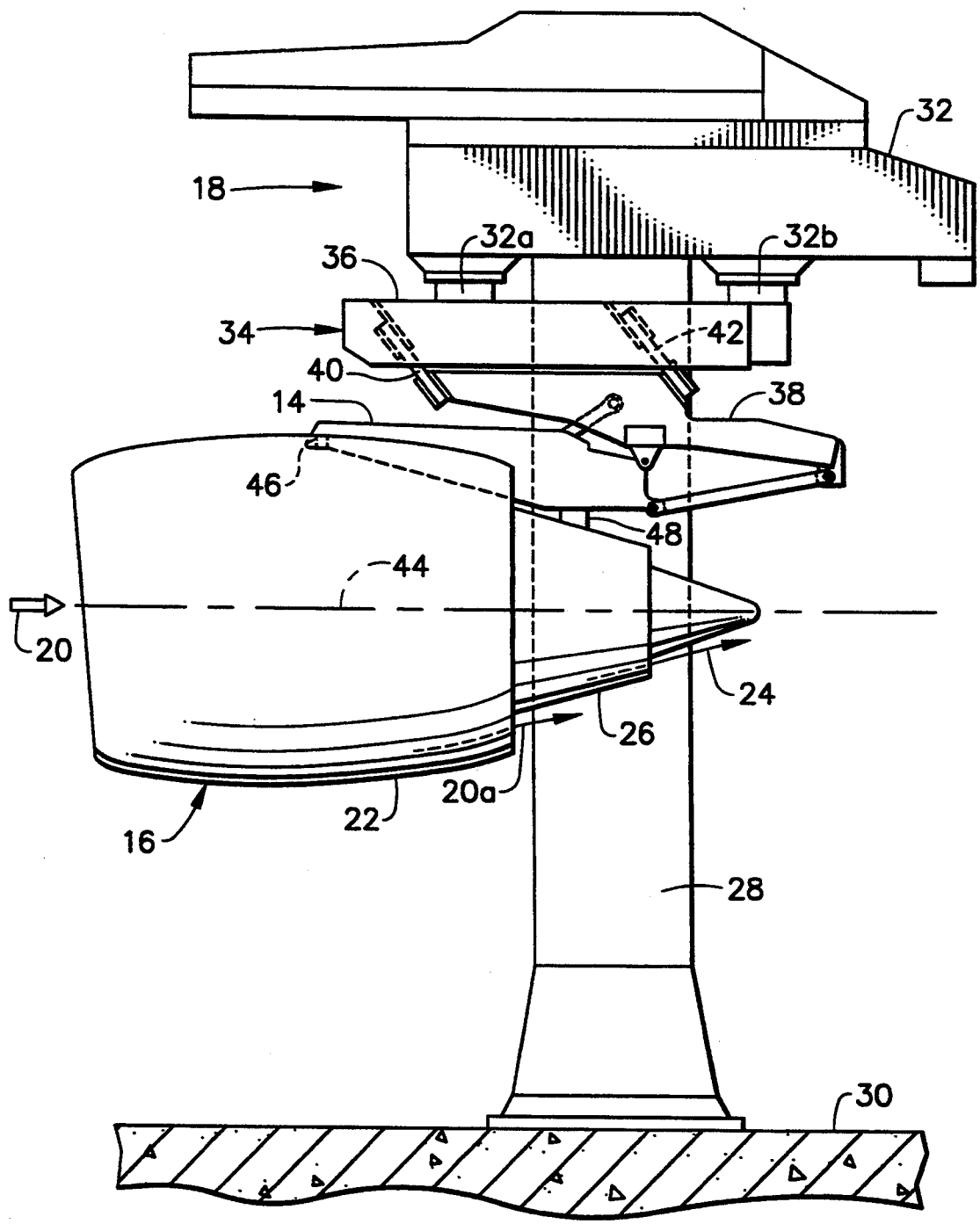
FIG. 2 is a schematic elevational view of a test stand having an adaptor in accordance with one embodiment of the present invention for mounting the aircraft engine thereto for testing.

As shown in FIG. 2, a test stand 18 in accordance with one embodiment of the present invention provides predetermined flexibility to simulate at least the vertical flexibility of the wing 12 shown in FIG. 1 in supporting the engine 16 for undergoing conventional vibratory ground testing. During ground testing, the engine 16 is conventionally operated for receiving and compressing ambient air 20 a portion of which is discharged from the outlet of the fan nacelle 22 as propulsion air 20a which provides thrust for propelling the aircraft. Another portion of the air is compressed inside the engine and mixed with fuel and ignited to generate combustion gas 24 which is discharged from the outlet of the exhaust nacelle 26 after energy therefrom has been extracted by the turbine blades.

The test stand 18 includes a substantially rigid vertical support column 28 fixedly joined at its lower end to a stationary foundation 30. The upper end of the column 28 supports a substantially rigid, conventional head frame 32 fixedly joined thereto.

A flexible engine testing mounting adaptor 34 in accordance with one embodiment of the present invention is provided for mounting the engine 16 to the test stand 18 for simulating the flexibility of the aircraft wing 12. The adaptor 34 is individually designed for simulating a respective aircraft wing 12 and may be readily assembled to and disassembled from the head frame 32 for simulating various engine installation systems. The adaptor 34 includes an upper frame 36 which is removably mountable on the head frame 32 of the test stand 18. The adaptor 34 also includes a lower frame 38 spaced vertically below the upper frame 36 which is configured for supporting the engine 16 either directly or indirectly through a respective pylon 14. Means in the exemplary form of a pair of laterally or horizontally spaced apart leaf-type springs 40, 42 are provided for flexibly joining the lower frame 38 to the upper frame 36 to simulate the flexibility of the aircraft wing 12 at the wing mount or pylon 14 for supporting the engine 16 thereto.

Figure 3:
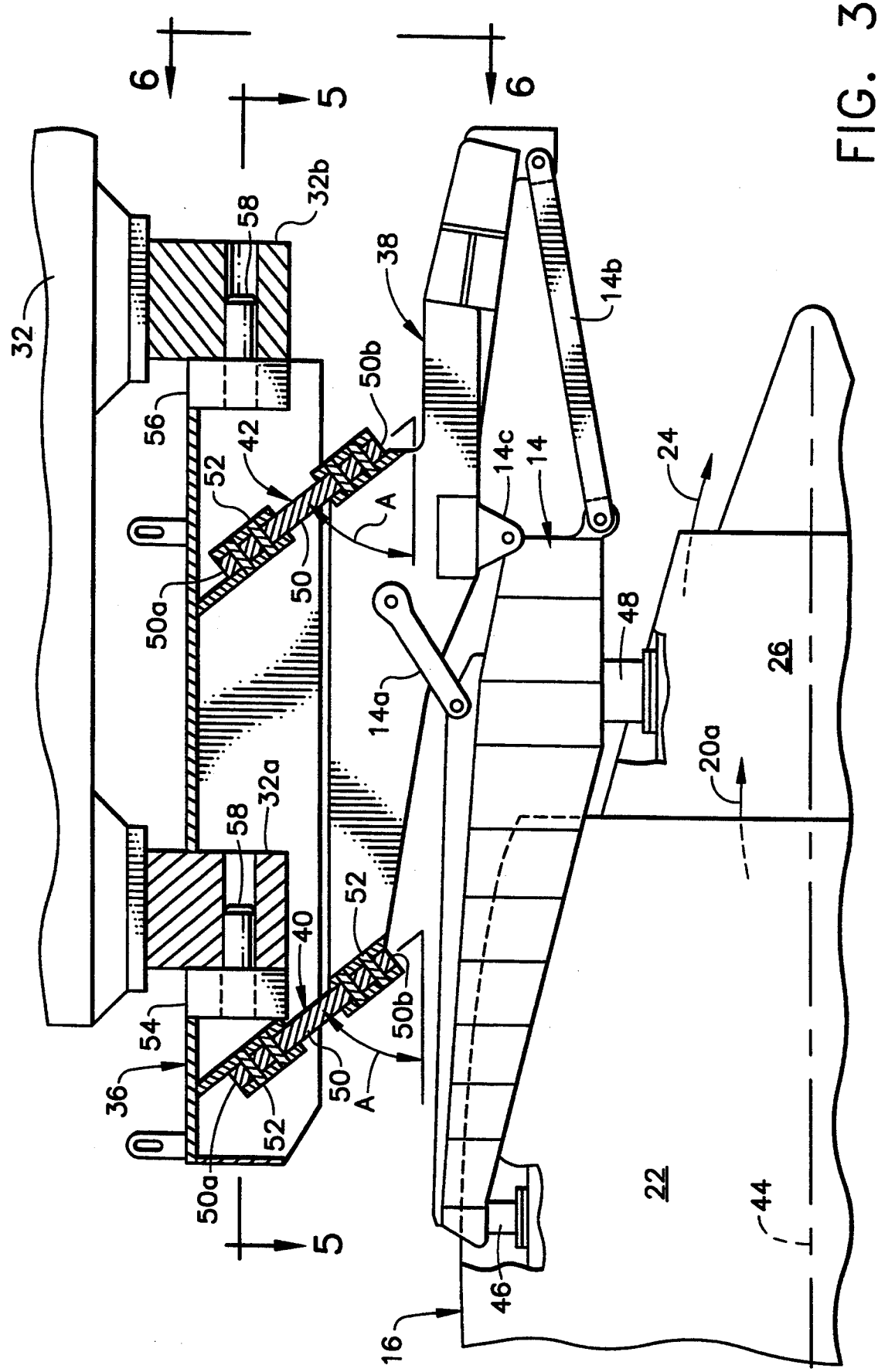
FIG. 3 is an enlarged, partly sectional, elevational view of the mounting adaptor illustrated in FIG. 2 shown between portions of the test stand and the engine.

In the exemplary embodiment illustrated in FIGS. 2 and 3, the engine 16 has a longitudinal or axial centerline axis 44 with the engine inlet and fan nacelle 22 being disposed forwardly or upstream of the exhaust nacelle 26 and the outlet of the engine 16. The engine 16 has a conventional forward mount 46 at its forward end, and a conventional aft mount 48 at its aft end which conventionally join the engine 16 to the pylon 14. The pylon 14, in turn, is conventionally joined to the lower frame 38 by a pair of conventional links 14a, 14b and a conventional pin joint 14c for example. In this way, the specific pylon 14 used in the aircraft 10 may be suitably mounted to the lower frame 38 to improve the installed system dynamics during the engine ground testing. The lower frame 38 therefore has a suitable configuration to mount thereto the required pylon 14, although the engine 16 may be directly mounted to the lower frame 38 in alternate embodiments if desired.

Referring to FIG. 3, two laterally spaced apart springs including a first spring 40 and a second spring 42 are shown in the exemplary embodiment although in alternate embodiments a suitable single spring could also be used. In the embodiment illustrated in FIG. 3, the first spring 40 is disposed forwardly of the second spring 42 and together are generally colinear with the axial centerline axis 44 (see FIG. 2), with the first spring 40 being positioned adjacent to the engine forward mount 46 for supporting the forward end of the lower frame 38, and the second spring 42 being positioned adjacent to the engine aft mount 48 for supporting the aft end of the lower frame 38. In this way, the springs 40, 42 are positioned front-to-back along the same axis as the front-to-back positioned forward and aft mounts 46, 48.

Figure 4:
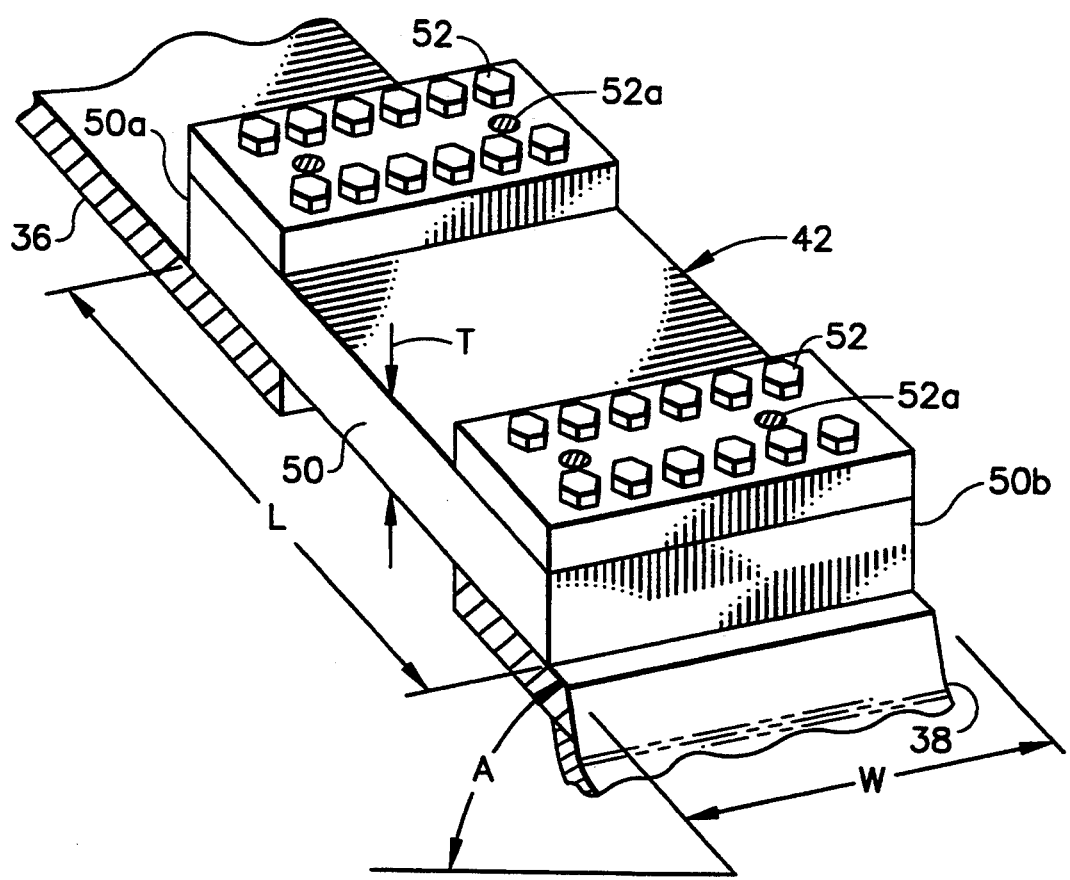
FIG. 4 is a perspective, partly sectional view of a portion of the mounting adaptor shown in FIG. 3 and illustrating an exemplary spring plate extending between the upper and lower frames thereof.

In the exemplary embodiment illustrated in FIG. 3, and in more particularity in FIG. 4, each of the first and second springs 40, 42 includes a single flat plate 50 fixedly joined at an upper end 50a thereof to the upper frame 36, and fixedly joined at a lower end 50b thereof to the lower frame 38. In the exemplary embodiments illustrated in FIGS. 3 and 4, the plates 50 are joined to the upper and lower frames 36, 38 by respective pluralities of conventional bolts 52 to ensure a rigid connection therewith. In alternate embodiments, each spring 40, 42 may include a plurality of stacked together flat plates if desired.

The bolts 52 may be suitably designed to accommodate shear loads. However, in the preferred embodiment, illustrated in FIGS. 4 and 5, a plurality of pins 52a extend through respective apertures in both ends 50a, 50b of the plates 50 and are suitably joined to the upper and lower frames 36, 38 for carrying shear loads thereto instead of being carried by the bolts 52. This may be accomplished by having a smaller clearance in the plate apertures around the pins 52a than around the bolts 52. The apertures in the plates 50 may take suitable forms such as circular and race-track (oval) so that the pins 52a may also be used to align the plates 50 during assembly.

In the exemplary embodiment illustrated, each of the plates 50 is substantially rectangular in configuration with a length L greater than its width W, with the length being measured between the upper and lower frames 36, 38, and the width being measured in the general direction of the circumference of the engine 16. Each plate has a thickness T, and in an exemplary embodiment wherein the plates 50 are steel, the thickness T may be about 10 cm, the length L is about 90 cm, and the width W is about 60 cm.

Also in the preferred embodiment illustrated in FIG. 3, the spring plates 50 of the first and second springs 40, 42 are preferably parallel to each other and inclined at an acute angle A relative to the horizontal line extending substantially parallel between the upper and lower frames 36, 38. In other words, the plates 50 are inclined relative to the vertical direction by the complement of the angle A so that they extend between the upper and lower frames 36, 38 obliquely therebetween for having a predetermined vertical flexibility substantially perpendicularly between the upper and lower frames 36, 38 to simulate vertical flexibility of the wing 12 at the wing mount pylon 14.

As shown in FIG. 3, the inclined plates 50 forming the forward and aft springs 40, 42, have a predetermined vertical flexibility which is substantially equal to the vertical flexibility of the wing 12 at the pylon 14 relative to the aircraft fuselage (see FIG. 1) to better simulate the installed system dynamics of the engine 16 during the ground testing thereof. As the engine 16 is operated on the ground, it is vertically suspended or supported from only its top by the two springs 40, 42 which have vertical flexibility simulating the wing 12. In this way, improved dynamic testing of the engine 16 is obtained for better determining the installed system dynamic performance thereof. The upper and lower frames 36, 38 are substantially rigid or may include additional flexibility as desired. The vertical flexibility of the first and second springs 40, 42 is about an order or magnitude greater than that of the pylon 14 as well as that of the head frame 32. And, the vertical flexibility of the springs 40, 42 is also about an order or magnitude greater than that of a conventional rigid adaptor typically used in a conventional test stand 18.

Figure 6:
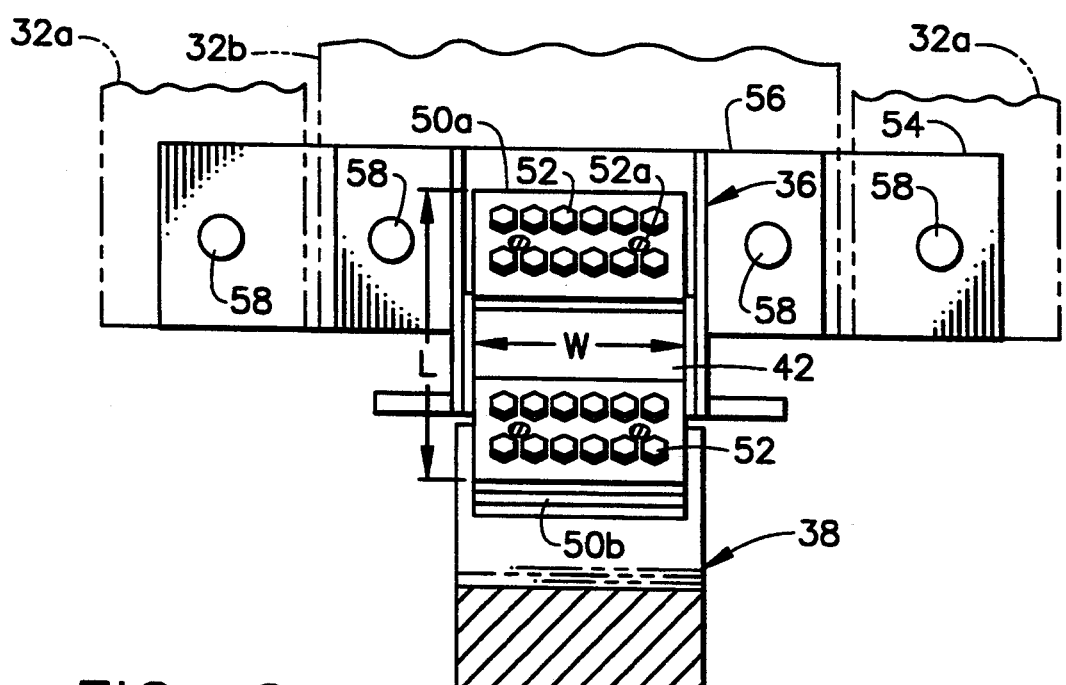
FIG. 6 is a forward facing, elevational view of the mounting adaptor illustrated in FIG. 3 and taken along line 6—6.
Figure 5:
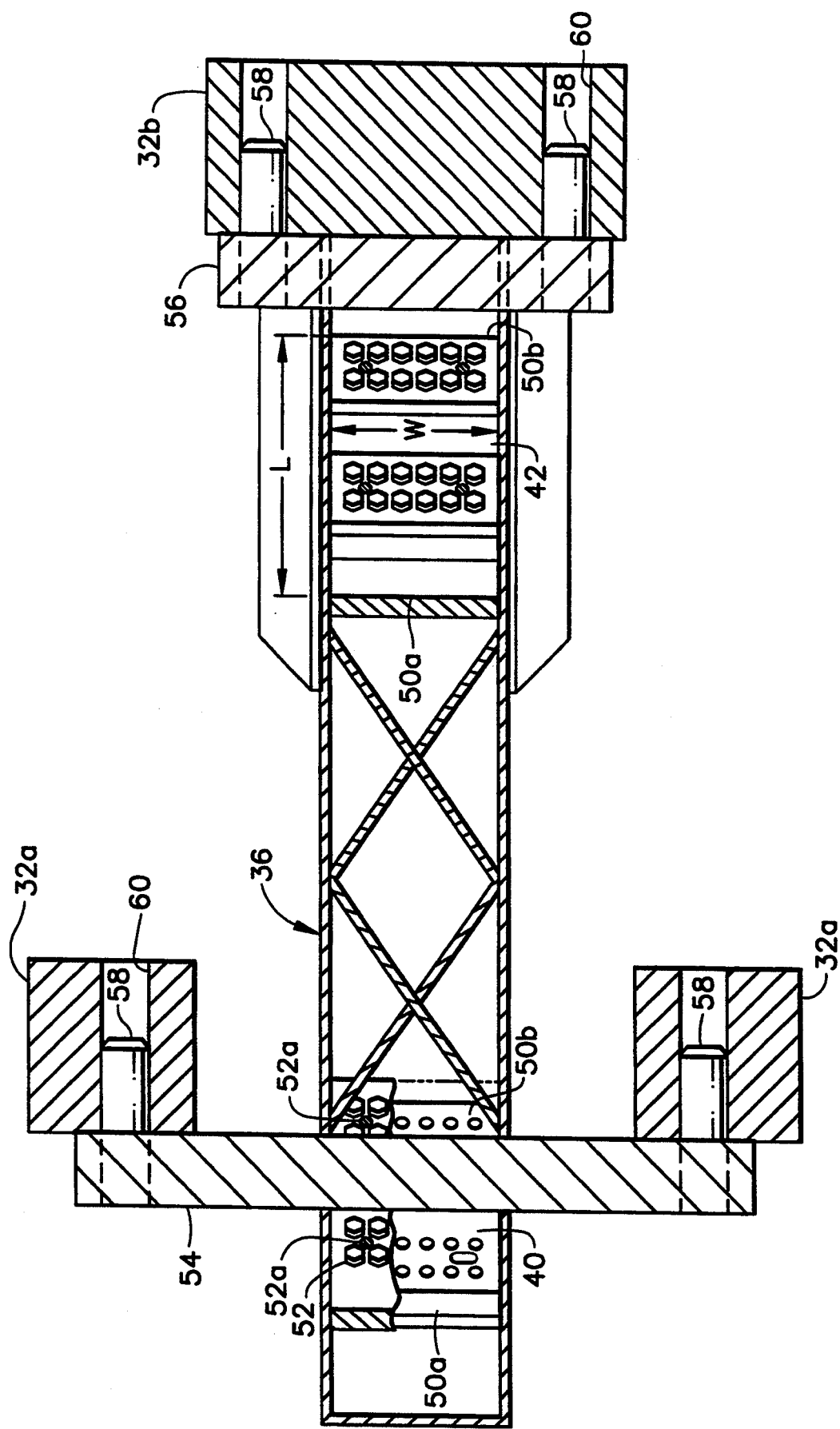
FIG. 5 is a top, partly sectional view of the mounting adaptor illustrated in FIG. 3 and taken along line 5—5.

As shown in FIG. 3, and additionally in FIGS. 5 and 6, the first and second springs 40, 42 are disposed colinearly with each other and are generally aligned with the centerline axis 44 of the engine 16, and both are inclined rearwardly and downwardly relative to the upper frame 36. In alternate embodiments, the plates 50 could be inclined forwardly and downwardly relative to the upper frame 36, i.e. opposite to that shown in FIG. 3.

As shown in FIGS. 5 and 6, the upper and lower frames 36, 38 are suitable box-like structures having conventional reinforcing plates and ribs as desired to provide relatively rigid structures for mounting the plates 50 therebetween. Since the width W of the plates 50 is oriented in the tangential or circumferential direction relative to the engine 16, the plates 50 are relatively rigid in that direction. However, since the vertical flexibility of the aircraft wing 12 is a primary factor in affecting installed system dynamics of the engine 16, the plates 50 are configured and oriented to primarily simulate the vertical flexibility of the aircraft wing 12 at the pylon 14.

Accordingly, the adaptor 34 provides a predetermined amount of vertical flexibility between the upper and lower frames 36, 38, and the thickness and orientation of the plates 50 is preselected for effecting a vertical stiffness or spring rate similar to the wing stiffness in the frequency range of interest or engine speed range being tested. In this way, the flexible mount adaptor 34 provides simulation of the on-wing engine dynamic characteristics when the engine 16 is tested on the test stand 18.

As a result thereof, more realistic dynamic response characteristics during the engine certification tests may be obtained, which yields loads and deflections of the engine 16 which more closely simulate those on the wing 12. This also provides better correlation between the engine response at the condition monitoring sensors during production acceptance testing with those obtained on-wing. This should lead to fewer engine removals during the production acceptance flight test for unacceptable vibration and cabin noise. Furthermore, the mount adaptor 34 itself is a preferred place to incorporate the desired flexibility in the test stand 18 since it may be configured to be engine family specific. The engine test stand 18 itself may remain rigid compared to the adaptor 34 and the pylon 14, and therefore different adaptors 34 may be used in the same test stand 18 with different engine types to simulate different aircraft wings.

As shown in FIG. 2, the mount adaptor 34 improves the overall test stand 18 and the engine 16 joined thereto by providing the predetermined flexibility, and by being removably mounted to the test stand 18 so that it may be readily removed. And, the engine 16 is also removably mounted to the lower frame 38 by the pylon 14 so that they too may be readily disassembled and interchanged as desired.

FIGS. 5 and 6 illustrate a preferred embodiment of the upper frame 36 which allows it to be readily assembled to and disassembled from the head frame 32. In this embodiment, the upper frame 36 includes a pair of conventional laterally spaced apart cross or support box-type beams including a first or forward support beam 54 disposed adjacent to the first spring 40, and a second or aft support beam 56 disposed adjacent to the second spring 42. Each of the first and second support beams 54, 56 includes conventional horizontal or axial, rearwardly facing pins 58 at opposite ends thereof, i.e. four pins 58, which extend axially therefrom for conventionally removably fixedly joining the upper frame 36 to the head frame 32 of the test stand 18 for obtaining a 4-point support system. The head frame 32 includes suitable downwardly extending supporting forward lugs 32a each having an aperture 60, as illustrated in FIG. 5 for example, in which is axially received a respective one of the pins 58. The head frame 32 also includes a downwardly extending aft lug 32b having a pair of the apertures 60 for axially receiving the pins 58 from the aft support beam 56. In this way, the entire adaptor 34 with the pylon 14 and engine 16 attached thereto may be conventionally carried by a suitable crane to the test stand 18 and joined thereto by simply axially translating the upper frame 36 until the pins 58 of the forward and aft support beams 54, 56 are inserted into the respective apertures 60 within the forward and aft lugs 32a, 32b. The upper frame 36 may then be suitably locked to the head frame 32 by other conventional bolts or pins (not shown) to prevent unintentional removal of the pins 58 from their mating apertures 60.

Although in the preferred embodiment described above, the springs 40, 42 are illustrated as simple rectangular steel plates, they may take any suitable alternate configuration for mounting the engine 16 to the test stand 18 with the preferred vertical flexibility to simulate wing stiffness while still being effective for carrying the substantial thrust forces generated during the operational testing of the engine 16 in the desired speed ranges of interest.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An adaptor for mounting an aircraft gas turbine engine to a test stand comprising:
   an upper frame configured for being mounted on said test stand;
   a lower frame spaced from said upper frame, and configured for supporting said engine; and
   means for flexibly joining said lower frame to said upper frame to simulate vertical flexibility of an aircraft wing at a wing mount for supporting said engine.

2. An adaptor according to claim 1 wherein said flexible joining means comprise a spring extending between said upper frame and said lower frame and configured for having a predetermined flexibility perpendicularly, between said upper and lower frames to simulate vertical flexibility of said wing at said wing mount.

3. An adaptor according to claim 2 wherein said engine has a forward mount at a forward end thereof and an aft mount at an aft end thereof, and wherein said flexible joining means comprise a pair of laterally spaced apart ones of said springs including a first spring disposed forwardly of a second spring, with said first spring being positionable adjacent to said forward mount, and said second spring being positionable adjacent to said aft mount.

4. An adaptor according to claim 3 wherein each of said first and second springs comprises a plate fixedly joined at an upper end thereof to said upper frame, and fixedly joined at a lower end thereof to said lower frame.

5. An adaptor according to claim 4 wherein said spring plates are joined to said upper and lower frames by respective pluralities of bolts and shear pins.

6. An adaptor according to claim 4 wherein said spring plates of said first and second springs are parallel to each other and inclined at an acute angle relative to a horizontal line extending substantially parallel between said upper and lower frames.

7. An adaptor according to claim 6 wherein each of said plates is substantially rectangular with a length greater than a width thereof, with said length being measured between said upper and lower frames.

8. An adaptor according to claim 6 in combination with said test stand and said engine, said upper frame being removably mounted to said test stand, and said engine being removably mounted to said lower frame.

9. A combination according to claim 8 further comprising an aircraft wing pylon fixedly joined to said lower frame and said engine for mounting said engine to said lower frame.

10. A combination according to claim 9 wherein said upper frame includes a pair of laterally spaced apart support beams including a first support beam disposed adjacent to said first spring, and a second support beam disposed adjacent to said second spring, said first support beam having opposite ends fixedly joined to said test stand, and said second support beam having opposite ends fixedly joined to said test stand for supporting said upper frame to said test stand at four points.

11. A combination according to claim 10 wherein said first and second support beams include axial pins extending respectively from said four ends thereof in a same direction and joined to said test stand for removably mounting said upper frame to said test stand upon axial translation therebetween.

* * * * *